US010620235B2

(12) United States Patent
Kokawa

(10) Patent No.: US 10,620,235 B2
(45) Date of Patent: Apr. 14, 2020

(54) CANTILEVER ATTACHMENT FITTING AND SCANNING PROBE MICROSCOPE PROVIDED THEREWITH

(71) Applicant: SHIMADZU CORPORATION, Kyoto-shi, Kyoto (JP)

(72) Inventor: Ryohei Kokawa, Kanagawa (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 575 days.

(21) Appl. No.: 15/030,914

(22) PCT Filed: Mar. 26, 2014

(86) PCT No.: PCT/JP2014/058436
§ 371 (c)(1),
(2) Date: Apr. 21, 2016

(87) PCT Pub. No.: WO2015/064123
PCT Pub. Date: May 7, 2015

(65) Prior Publication Data
US 2016/0245844 A1 Aug. 25, 2016

(30) Foreign Application Priority Data
Oct. 31, 2013 (JP) .................... 2013-226449

(51) Int. Cl.
*G01Q 70/02* (2010.01)
*G01Q 60/16* (2010.01)
*G01Q 60/38* (2010.01)

(52) U.S. Cl.
CPC ............. *G01Q 70/02* (2013.01); *G01Q 60/16* (2013.01); *G01Q 60/38* (2013.01)

(58) Field of Classification Search
CPC ........ G01Q 10/00; G01Q 10/02; G01Q 10/04; G01Q 70/00; G01Q 70/02; G01Q 70/06; G01Q 70/08; G01Q 70/16
(Continued)

(56) References Cited

U.S. PATENT DOCUMENTS 5,450,746 A * 9/1995 Howard ................. B82Y 35/00
73/105
5,705,814 A * 1/1998 Young .................... G01Q 30/06
250/307

FOREIGN PATENT DOCUMENTS

JP        8-146013 A    6/1996
JP    2001-500958 A    1/2001

OTHER PUBLICATIONS

International Search Report for PCT/JP2014/058436 dated Jun. 17, 2014.

* cited by examiner

Primary Examiner — Jason L McCormack
(74) Attorney, Agent, or Firm — Sughrue Mion, PLLC

(57) ABSTRACT

The invention provides a cantilever attachment fitting that makes it easy to attach a cantilever to a cantilever holder. The cantilever attachment fitting has an attachment platform of which the upper surface is to have a cantilever placed on, a pressing member for pressing the cantilever against the upper surface of the attachment platform, and a lifting mechanism for moving the pressing member upward from the upper surface of the attachment platform. The cantilever attachment fitting is further provided with: a sliding platform having a sliding surface for sliding the cantilever toward the attachment platform; a base for fixing the cantilever holder in the horizontal direction so that the attachment platform is (Continued)

in a predetermined location relative to the sliding platform; and a pressing unit for pressing downward the cantilever holder fixed to the base.

4 Claims, 8 Drawing Sheets

(58) Field of Classification Search
USPC .................................... 850/2, 3, 53, 55, 60
See application file for complete search history.

CANTILEVER ATTACHMENT FITTING AND SCANNING PROBE MICROSCOPE PROVIDED THEREWITH

CROSS REFERENCE TO RELATED APPLICATIONS

This application is a National Stage of International Application No. PCT/JP2014/058436 filed Mar. 26, 2014, claiming priority based on Japanese Patent Application No. 2013-226449 filed Oct. 31, 2013, the contents of all of which are incorporated herein by reference in their entirety.

TECHNICAL FIELD

The present invention relates to a cantilever attachment fitting and a scanning probe microscope provided therewith, and in particular a scanning probe microscope represented by an atomic force microscope (AFM).

BACKGROUND ART

Scanning probe microscopes are used to detect a physical quantity generated through the interaction between a probe and the surface of a sample when the sample and the probe that is arranged so as to face the sample are made to come close to each other so that the probe or the sample is scanned in order to measure the form of the surface of the sample with the resolution at an atomic level. Scanning tunneling microscopes (STMs) and atomic force microscopes (AFMs) fall within such scanning probe microscopes.

Atomic force microscopes (AFMs) are used to measure a microscopic interatomic force generated between atoms at the tip of a probe and atoms on the surface of a sample when the probe supported by a cantilever or the like is made to come close to the surface of the sample in order to measure the uneven form on the surface of the sample from the track of the probe or the sample in the direction of the height when the distance between the probe and the sample is adjusted so that the interatomic force between them becomes constant while scanning the surface of the sample by using the properties such that the interatomic force is uniquely determined by the distance between the probe and the sample.

In addition, scanning tunneling microscopes (STMs) are used to observe the form on the surface of a sample with the resolution at an atomic level by applying a voltage between the sample and a probe that is provided so as to face this sample and scanning the probe or the sample so that the tunneling current that flows between the two becomes constant. That is to say, the unevenness on the surface of a sample is measured by measuring the amount of control by a precision drive mechanism such as of a piezoelectric element with which the height of the probe or the sample is controlled so that the tunneling current becomes constant by using such properties that the tunneling current is uniquely determined by the distance between the probe and the sample.

FIG. 7 is a schematic diagram showing a general configuration of an atomic force microscope (AFM). Here, one direction that is horizontal relative to the ground is the X direction (left and right directions), the direction that is horizontal relative to the ground and perpendicular to the X direction is the Y direction (front and rear directions), and the direction that is perpendicular to the X and Y directions is the Z direction (upward and downward directions).

In addition, FIG. 8 is a plan diagram showing a general cantilever holder 20. FIGS. 9A and 9B are cross-sectional diagrams along line C-C in FIG. 8. FIG. 9A is a diagram showing the completion of the attachment of a cantilever 1 to the cantilever holder 20. FIG. 9B is a diagram showing the process during the attachment of the cantilever 1 to the cantilever holder 20.

The atomic force microscope (AFM) is provided with the cantilever holder 20 for supporting the cantilever 1, displacement measuring unit portions 3, 4, 5 and 6 for measuring the displacement of the cantilever 1, a table 8 in disc form on which a sample S is to be placed, a piezo scanner (scanning means) 7 of which the upper surface has the table 8 attached thereto, and a control unit (not shown).

Various types of measurement modes such as a contact mode, a contact height mode, a non-contact mode and a dynamic mode are stored in the control unit.

The "contact mode" is a mode for measuring the height from the amount of feedback by scanning the surface of the sample S while the control unit carries out feedback control so that the repulsive force working between the cantilever 1 and the sample S becomes constant. In addition, the "contact height mode" is a mode for measuring the height of the surface of the sample S from the amount of deflection of the cantilever 1 by scanning the surface of the sample S while maintaining the height of the cantilever 1 at a constant. Furthermore, the "non-contact mode" is a mode for measuring the height of the surface of the sample S from the amount of feedback by scanning the surface of the sample S while carrying out feedback control so that the attractive force working between the cantilever 1 that oscillates in the vicinity of the resonance point and the sample S becomes constant. Moreover, the "dynamic mode" is a mode for measuring the height of the surface of the sample S from the amount of feedback by scanning the surface of the sample S while carrying out feedback control so that the repulsive force working between the cantilever 1 that oscillates in the vicinity of the resonance point and the sample S becomes constant.

The cantilever 1 is in a plate form having a length of 100 μm and a thickness of 0.8 μm, for example, and an acute probe 1a is formed on the surface of one tip portion. In addition, the other tip portion of the cantilever 1 can be attached to a predetermined point on the cantilever holder 20.

The displacement measuring unit portions 3 through 6 are a laser beam source 3 for emitting a laser beam, a beam splitter 4 for directing the incoming laser beam toward the rear of the cantilever 1, a mirror 5 for adjusting the direction of the laser beam that has been reflected from the rear of the cantilever 1, and a photodiode 6 for detecting the reflected laser beam. As a result, the form of the surface of the sample S is detected by using the fact that the direction of reflection of the beam reflected from the rear of the cantilever 1 changes depending on the deflection (displacement) of the cantilever 1 in the above-described various types of measurement modes.

The table 8 is in a disc form having a diameter of 15 mm as viewed from the top and a thickness of 4 mm as viewed from the side, for example.

The table 8 is attached to and integrated with the upper surface of the piezo scanner 7 so that the table 8 can be scanned in the X direction, in the Y direction and in the Z direction using a piezo element. That is to say, the sample S placed on the table 8 can be scanned in the X, Y and Z directions by the control unit.

Incidentally, the operator selects one cantilever 1 from among a number of types of cantilevers 1 contained in a cantilever case for use in accordance with the sample S and the purpose of measurement before the unevenness on the surface of the sample S is measured with the atomic force microscope. That is to say, it is necessary for the operator to attach the other tip portion of the selected cantilever 1 to a predetermined point (below-described attachment portion 21) on the cantilever holder 20.

The cantilever holder 20 is provided with a main body portion 22 having the attachment portion 21 to which the cantilever 1 is to be attached and a grip 23 held by the operator when the cantilever holder 20 is attached to the atomic force microscope.

The main body portion 22 is in a U shape having a left side main body portion 22a, a right side main body portion 22b and a rear side main body portion 22c for connecting the rear of the left side main body portion 22a and the rear of the right side main body portion 22b in the X direction, where the attachment portion 21 is formed in the center on the upper surface of the left side main body portion 22a.

The attachment portion 21 has an attachment platform 21a in a rectangular parallelepiped form (2 mm×4 mm×3 mm, for example), a plate spring (pressing member) 21b in a Y shape and a lifting member (lifting mechanism) 21c in a columnar form arranged in the Z direction (see Patent Document 1).

Here, the upper surface of the attachment platform 21a is an inclined surface that gradually declines in the –X direction at an angle of 7°, for example.

The right side portion of the plate spring 21b is in a U shape having a rear plate body, a front plate body and a left plate body for connecting the left portion of the rear plate body and the left portion of the front plate body in the Y direction. The distance between the front plate body and the rear plate body is 3 mm, for example, and one wire 21e (having a diameter of 0.3 mm and a length of 5 mm, for example) is provided between the right portion of the rear plate body and the right portion of the front plate body so as to connect the two in the Y direction. Meanwhile, the left side portion of the plate spring 21b is fixed to the upper surface of the left side main body portion 22a via a screw 21d so that the right side portion of the plate spring 21b can move upward (Z direction) when the plate spring 21b bends with the left end portion of the plate spring 21b being the axis. Thus, the wire 21e in the right end portion of the plate spring 21b is provided so as to be pressed against the upper surface of the attachment platform 21a by means of the elastic force of the plate spring 21b.

In addition, a through hole 22d in a columnar form is created in the location of the left side main body portion 22a beneath the center portion of the plate spring 21b, and a lifting member 21c in a columnar form is provided within the through hole 22d that is in the Z direction. The height of the lifting member 21c is greater than the height of the through hole 22d so that the upper end portion of the lifting member 21c protrudes from the upper surface of the left side main body portion 22a so as to press the middle portion of the plate spring 21b upward (Z direction). That is to say, a gap for arranging the cantilever 1 is created between the upper surface of the attachment platform 21a and the lower surface of the wire 21e when the middle portion of the plate spring 21b is pressed upward (Z direction). When the upper end portion of the lifting member 21c does not protrude from the upper surface of the left side main body portion 22a, the lower end portion of the lifting member 21c protrudes from the lower surface of the left side main body portion 22a.

Next, the attachment method for attaching the cantilever 1 to the cantilever holder 20 is described. First, the operator selects an optimal type of cantilever 1 in accordance with the size of the sample S, and then places the cantilever holder 20 on the table so that the upper surface of the cantilever holder 20 faces upward. At this time, the lower end portion of the lifting member 21c protrudes from the lower surface of the left side main body portion 22a, and therefore, such a state is achieved that the upper surface of the cantilever holder 20 inclines relative to the horizontal surface (surface of the table). Next, the upper surface of the front portion and the upper surface of the rear portion of the left side main body portion 22a of the cantilever holder 20 are pressed downward with the left hand fingers. As a result, the upper surface of the cantilever holder 20 becomes parallel to the horizontal surface, and the lower end portion of the lifting member 21c is pressed upward with the surface of the table. As the lifting member 21c protrudes from the upper surface of the left side main body portion 22a, the right end portion of the plate spring 21b moves upward. That is to say, a gap is created between the upper surface of the attachment platform 21a and the lower surface of the wire 21e (see FIG. 9B).

In this state, tweezers (not shown) are held by the right hand, and the selected cantilever 1 is held by the tweezers. Then, the cantilever 1 held by the tweezers is inserted into the gap between the upper surface of the attachment platform 21a and the lower surface of the wire 21e, and thus is arranged. At this time, the cantilever 1 is positioned so that there is no shift in the location and at the angle.

Finally, pressing the upper surface of the front portion and the upper surface of the rear portion of the left side main body portion 22a of the cantilever holder 20 downward with the left hand fingers is gradually stopped in the state where the cantilever 1 is positioned, and thus, the cantilever 1 is sandwiched and fixed between the upper surface of the attachment platform 21a and the lower surface of the wire 21e (see FIG. 9A).

PRIOR ART DOCUMENT

Patent Document

Patent Document 1: Japanese Unexamined Patent Publication H8 (1996)-146013

SUMMARY OF THE INVENTION

1. Problem to be Solved by the Invention

It is very difficult for a novice (operator) to deal with the above-described work for attaching the cantilever 1 to the cantilever holder 20.

2. Means for Solving Problem

The present inventor examined the attachment method for attaching the cantilever 1 to the cantilever holder 20 in order to solve the above-described problem. As a result of observing the ways novice operators failed, it was found that the cantilever 1, in most cases, was dropped when the cantilever 1 was placed between the upper surface of the attachment platform 21a and the lower surface of the wire 21e. This was because it was necessary for the cantilever 1 held by the tweezers in the right hand to be positioned so that there were no shifts in the location and at the angle while maintaining such a state where the upper surface of the front portion and the upper surface of the rear portion of the left side main body portion 22a of the cantilever holder 20 were being pressed downward with the left hand fingers.

When the pressing of the upper surface of the front portion and the upper surface of the rear portion of the left side main body portion 22a of the cantilever holder 20 downward with the left hand fingers is stopped abruptly instead of gradually in the state where the cantilever 1 is positioned, the lower surface of the wire 21e makes sudden contact with the cantilever 1, which sometimes flings the cantilever 1.

Therefore, a cantilever attachment fitting with which the operator can concentrate only on the positioning of the cantilever 1 without a shift in the location or at the angle has been developed.

That is to say, the cantilever attachment fitting according to the present invention is a cantilever attachment fitting to be used for a cantilever holder having an attachment platform of which the upper surface is to have a cantilever placed on, a pressing member for pressing the cantilever against the upper surface of the attachment platform, and a lifting mechanism for moving the pressing member upward from the upper surface of the attachment platform, and is provided with: a sliding platform having a sliding surface along which the above-described cantilever is to be slid by a person toward the above-described attachment platform; a base for fixing the above-described cantilever holder in the horizontal direction so that the above-described attachment platform is in a predetermined location relative to the above-described sliding platform; and a pressing unit for pressing downward the above-described cantilever holder fixed to the above-described base.

Here, the "pressing member" may be anything with which the cantilever can be pressed against the attachment platform, and a plate spring having a wire (elastic member) and a plate body that can be fixed with a screw can be cited as examples.

In addition, the "lifting mechanism" may be anything that can create a gap between the attachment platform and the pressing member, and a lifting member (body in rod form) with which the entirety or part of the pressing member can be moved upward and a mechanism for loosening a wire of a member that has a wire can be cited as examples.

Here, the cantilever holder is turned over for use so that the upper surface for attaching the cantilever becomes the lower surface when attached to a scanning probe microscope (SPM) (see FIGS. 7 through 9B).

First, an operator fixes the cantilever holder to the base of the cantilever attachment fitting according to the present invention so that the upper surface of the cantilever holder faces upward. Next, the cantilever holder is pressed downward with the pressing unit. That is to say, unlike the prior art, it is not necessary to do any other work while pressing the cantilever holder downward with a hand.

Then, the lifting mechanism is used to move the pressing member upward, and thus, a gap is created between the upper surface of the attachment platform and the pressing member.

Next, tweezers are prepared, and a cantilever is held with the tweezers. Then, the cantilever held by the tweezers is once placed on the upper surface of the sliding surface. After that, the tweezers are used to gradually slide the cantilever along the upper surface of the sliding surface so that the cantilever is inserted into the gap between the upper surface of the attachment platform and the pressing member, and then is arranged. At this time, it is necessary for the operator to position the cantilever so that there are no shifts in the location or at the angle. However, the operator may only concentrate on the positioning work.

Thus, the lifting mechanism is used in the state where the cantilever is positioned so that the cantilever is sandwiched and fixed between the upper surface of the attachment platform and the pressing member.

Finally, the pressing of the cantilever holder downward with the pressing unit is stopped so that the cantilever holder is removed from the base of the cantilever attachment fitting.

3. Effects of the Invention

As described above, the cantilever attachment fitting according to the present invention allows a cantilever to be placed on the upper surface of the sliding surface, and in addition allows the operator to concentrate on only the positioning, and therefore, even a novice (operator) can easily attach the cantilever to the cantilever holder.

Other Means for Solving the Problem and Effects Thereof

In addition, the cantilever attachment fitting according to the present invention may be used for a cantilever holder where the above-described lifting mechanism is a lifting member that moves in the upward and downward directions, a hole into which the lower end portion of the above-described lifting mechanism is inserted may be created in the above-described base, and an upward and downward moving member which is movable in the upward and downward directions may be provided in the hole, and a moving mechanism may be provided in order to move the above-described upward and downward moving member in the upward and downward directions.

When a cantilever holder is fixed to the base of the cantilever attachment fitting according to the present invention, the lower end portion of the lifting member is inserted into the hole. Thus, the speed at which the upward and downward moving member is moved in the upward and downward directions with the moving mechanism and the amount of movement are controlled so that the speed at which the lifting member of the cantilever holder moves in the upward and downward directions and the amount of movement can be appropriately controlled.

Furthermore, in the cantilever attachment fitting according to the present invention, the above-described moving mechanism may be provided with a horizontally moving member that moves in order to move the above-described upward and downward moving member in the upward and downward directions, where the horizontally moving member moves using a lever principle.

In the cantilever attachment fitting according to the present invention, the speed at which the upward and downward moving member moves in the upward and downward directions using a lever principle and the amount of movement can be easily controlled, and therefore, the speed at which the lifting member of the cantilever holder moves in the upward and downward directions and the amount of movement can be easily and appropriately controlled.

In addition, the scanning probe microscope according to the present invention may be provided with the above-described cantilever attachment fitting, the above-described cantilever holder, a displacement measuring unit for measuring the displacement of the above-described cantilever, a table on which a sample is to be placed, and a scanning means for scanning by moving the above-described table or the above-described cantilever holder.

Here, the "scanning means" is a thing that can be moved in at least one direction from among the X, Y and Z directions, and a piezo scanner can be cited as an example.

DETAILED DESCRIPTION OF EMBODIMENTS

In the following, an embodiment of the present invention is described in reference to the drawings. Here, the present invention is not limited to the below-described embodiment, but rather it is needless to say that the present invention includes various modifications as long as the gist of the invention is not deviated from.

Figure 1:
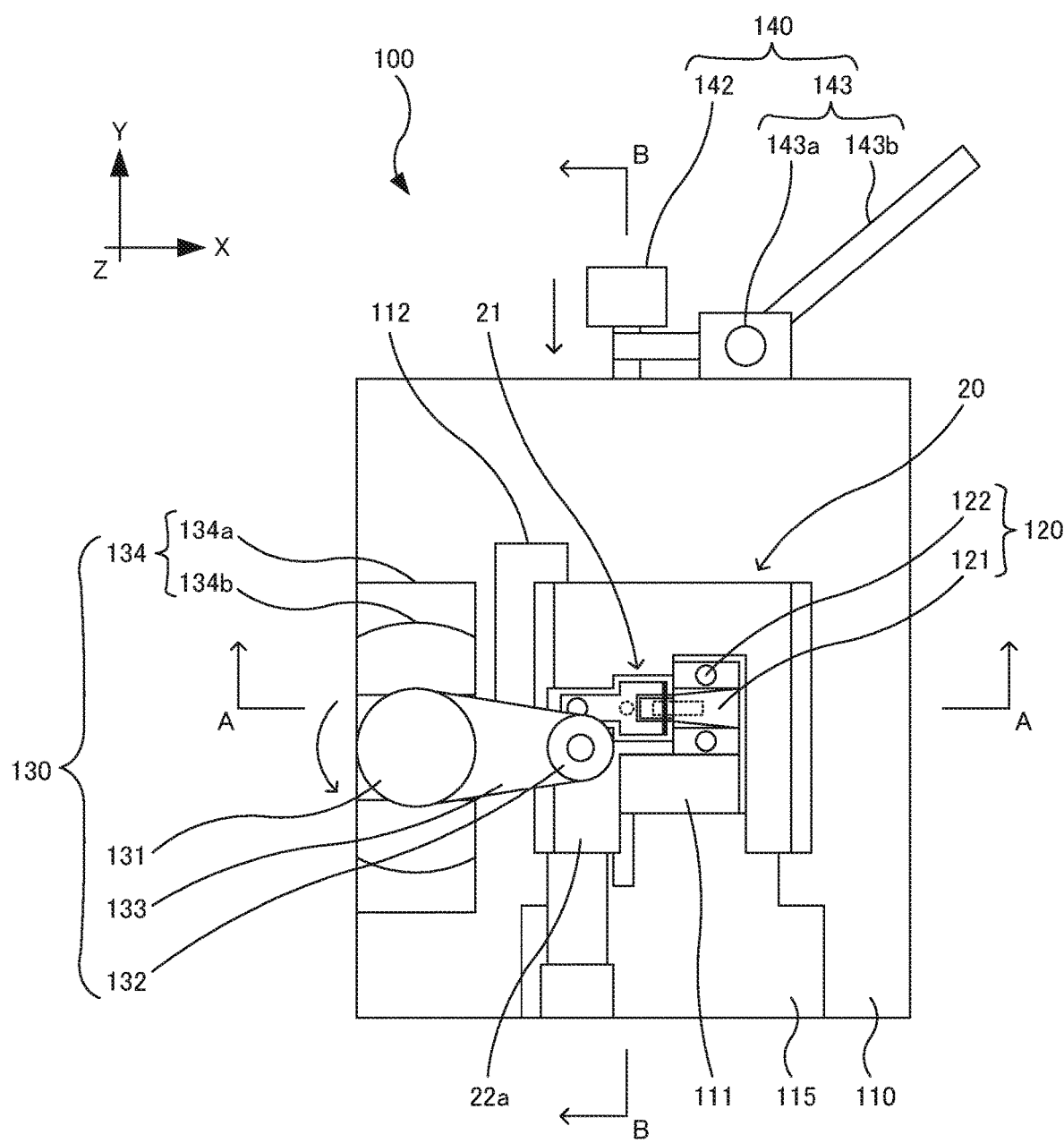
FIG. 1 is a plan diagram showing the cantilever attachment fitting according to one embodiment of the present invention.
Figure 2:
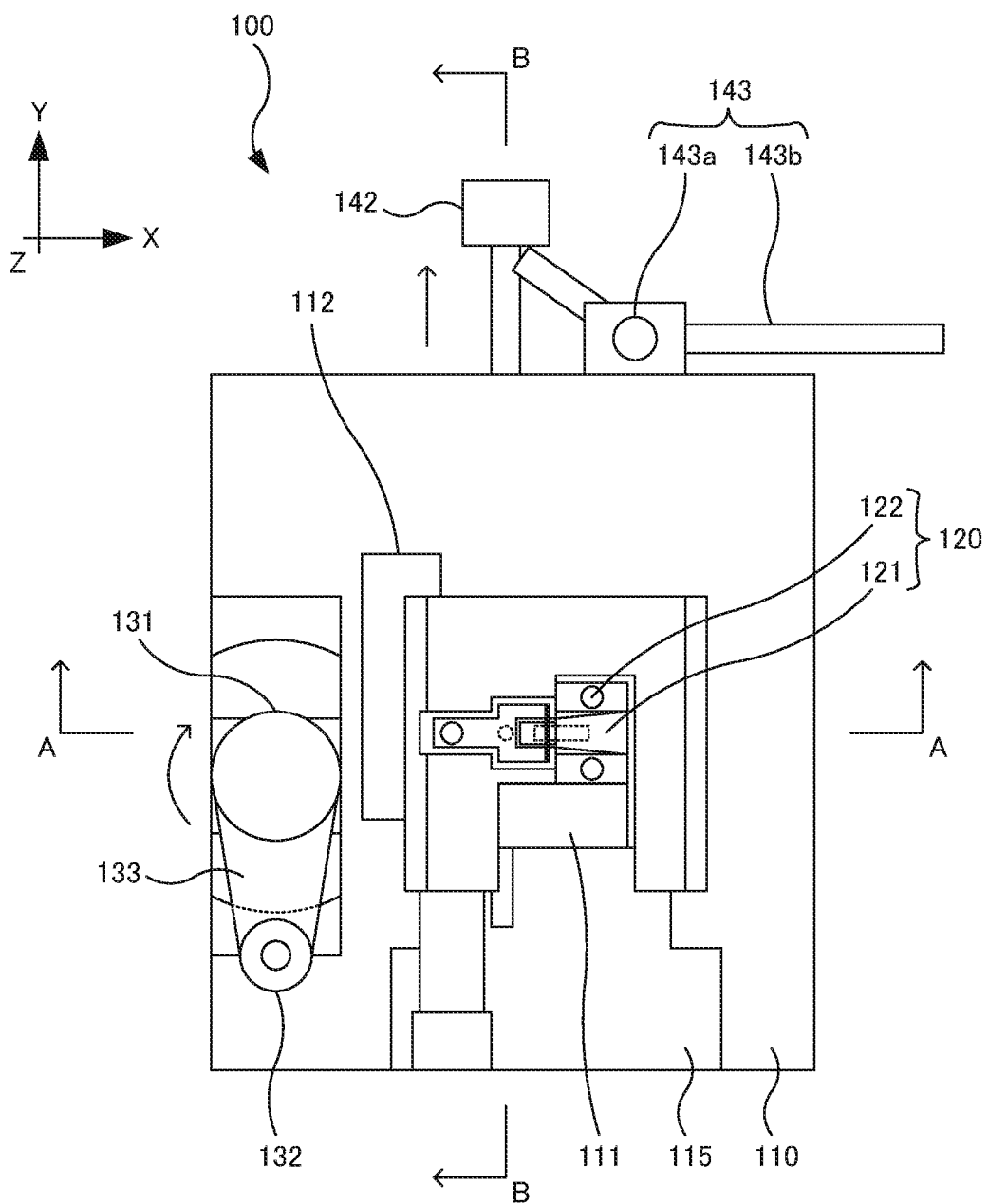
FIG. 2 is a plan diagram showing the cantilever attachment fitting according to one embodiment of the present invention.
Figure 3:
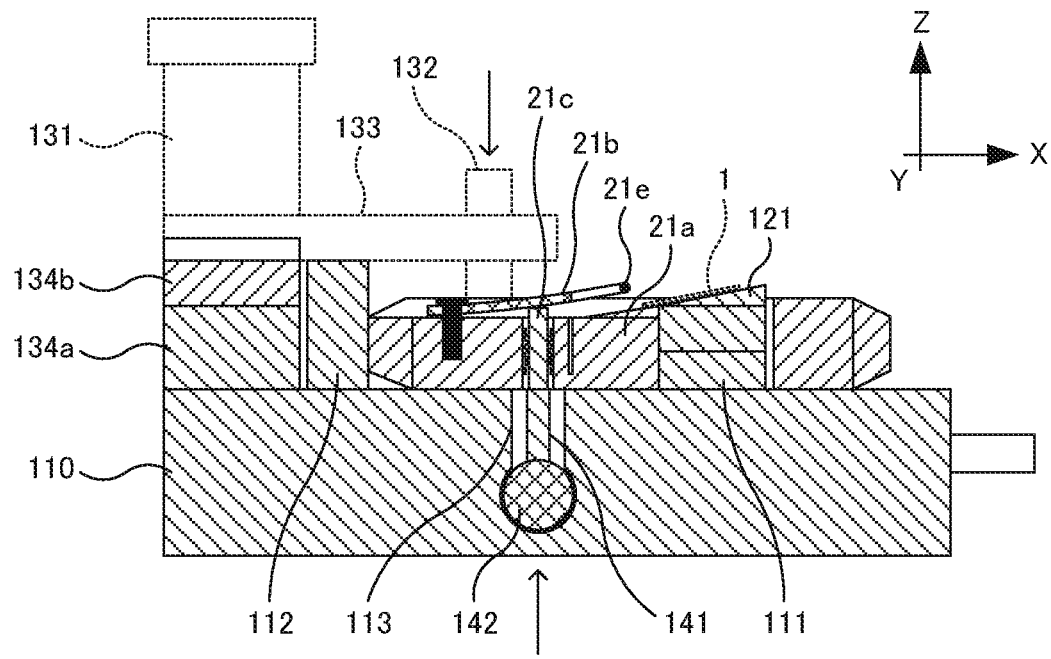
FIG. 3 is a cross-sectional diagram along line A-A in FIG. 1.
Figure 4:
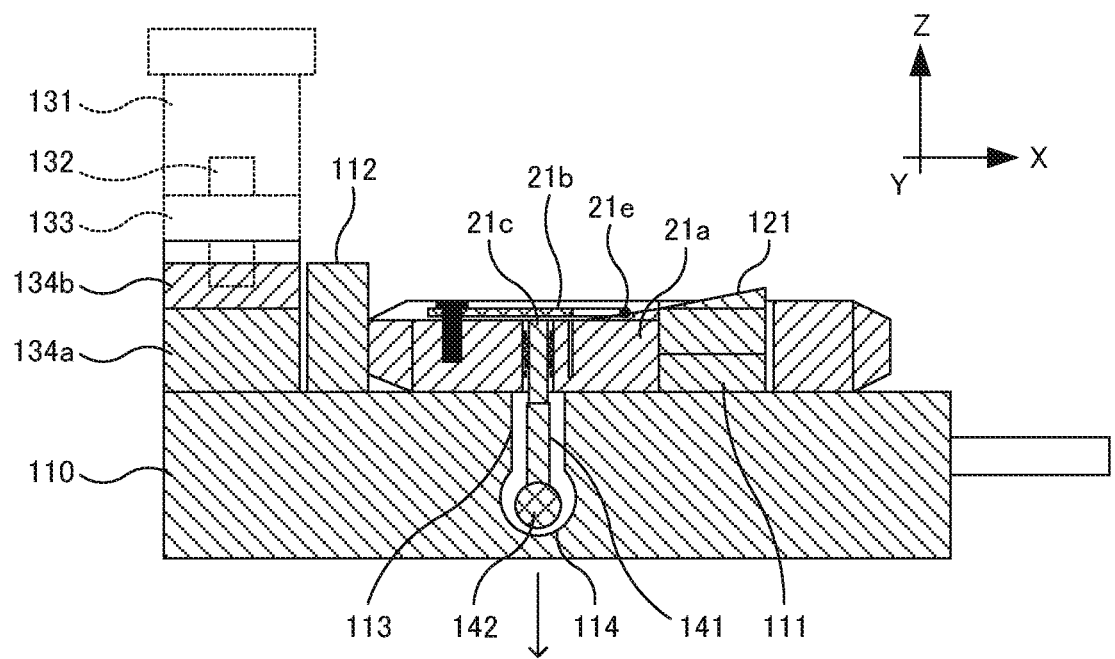
FIG. 4 is a cross-sectional diagram along line B-B in FIG. 1.
Figure 5:
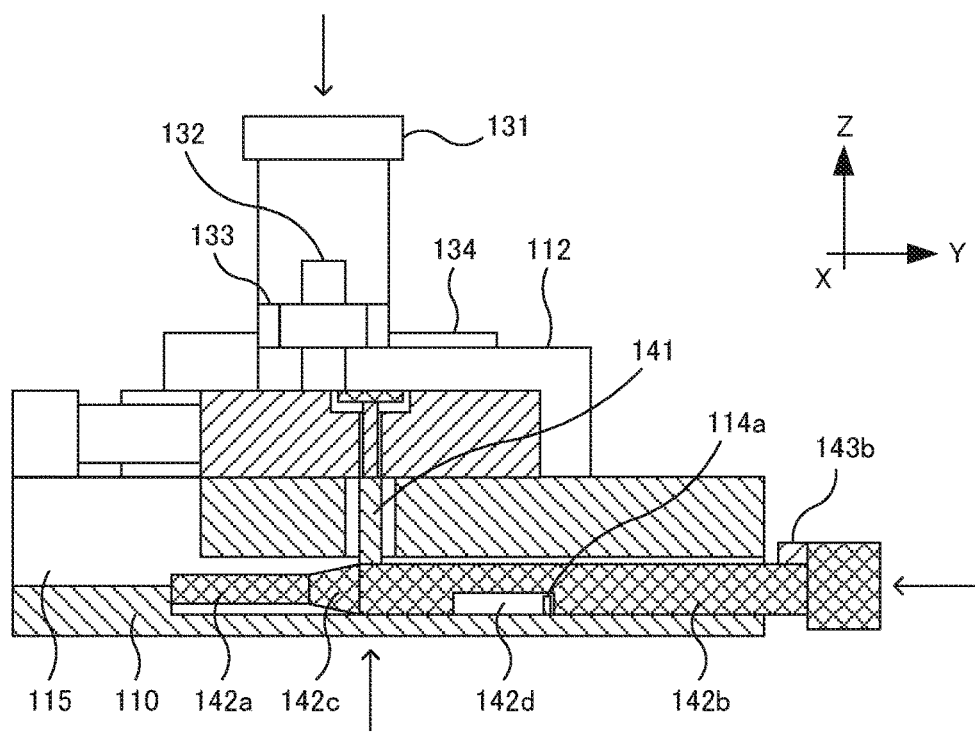
FIG. 5 is a cross-sectional diagram along line A-A in FIG. 2.
Figure 6:
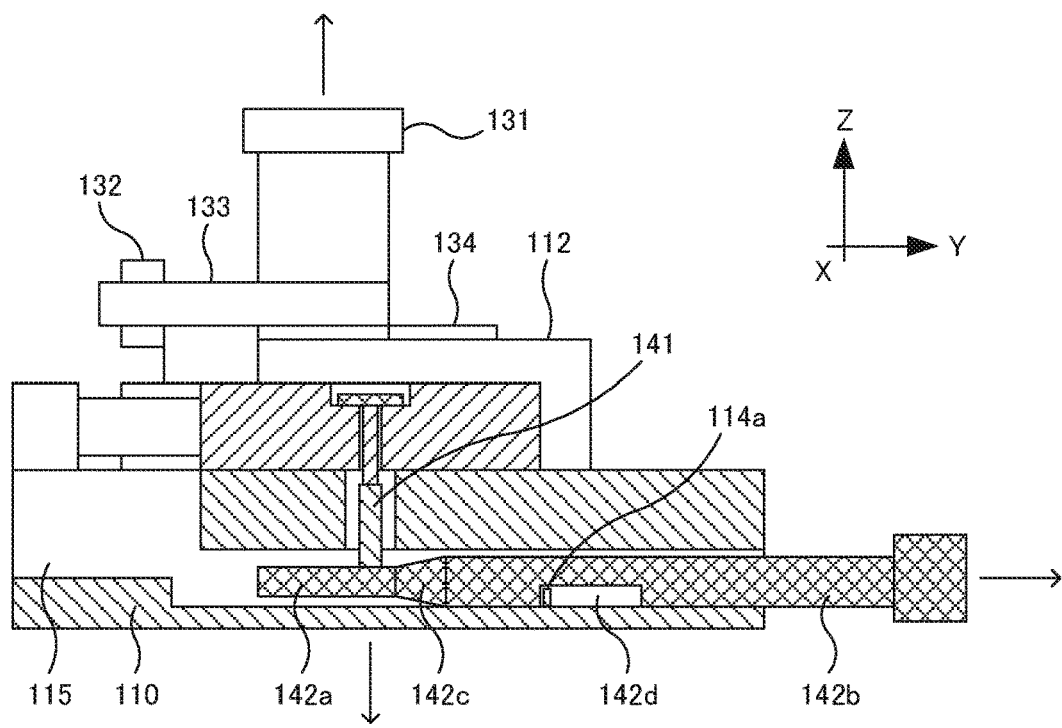
FIG. 6 is a cross-sectional diagram along line B-B in FIG. 2.
Figure 7:
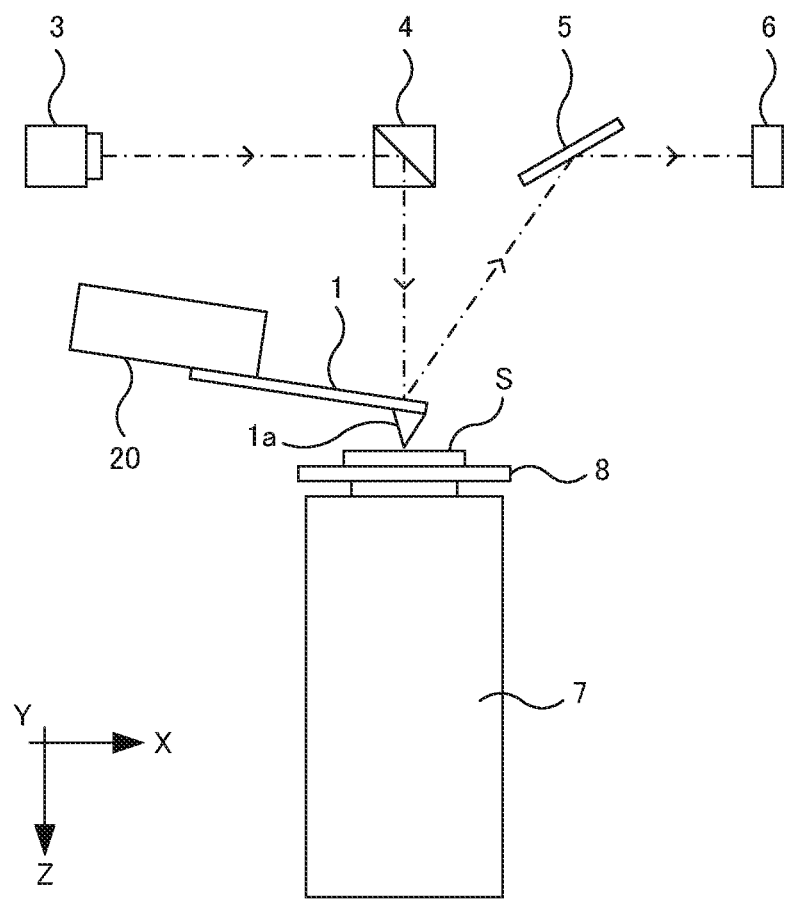
FIG. 7 is a schematic diagram showing the configuration of a general atomic force microscope.
Figure 8:
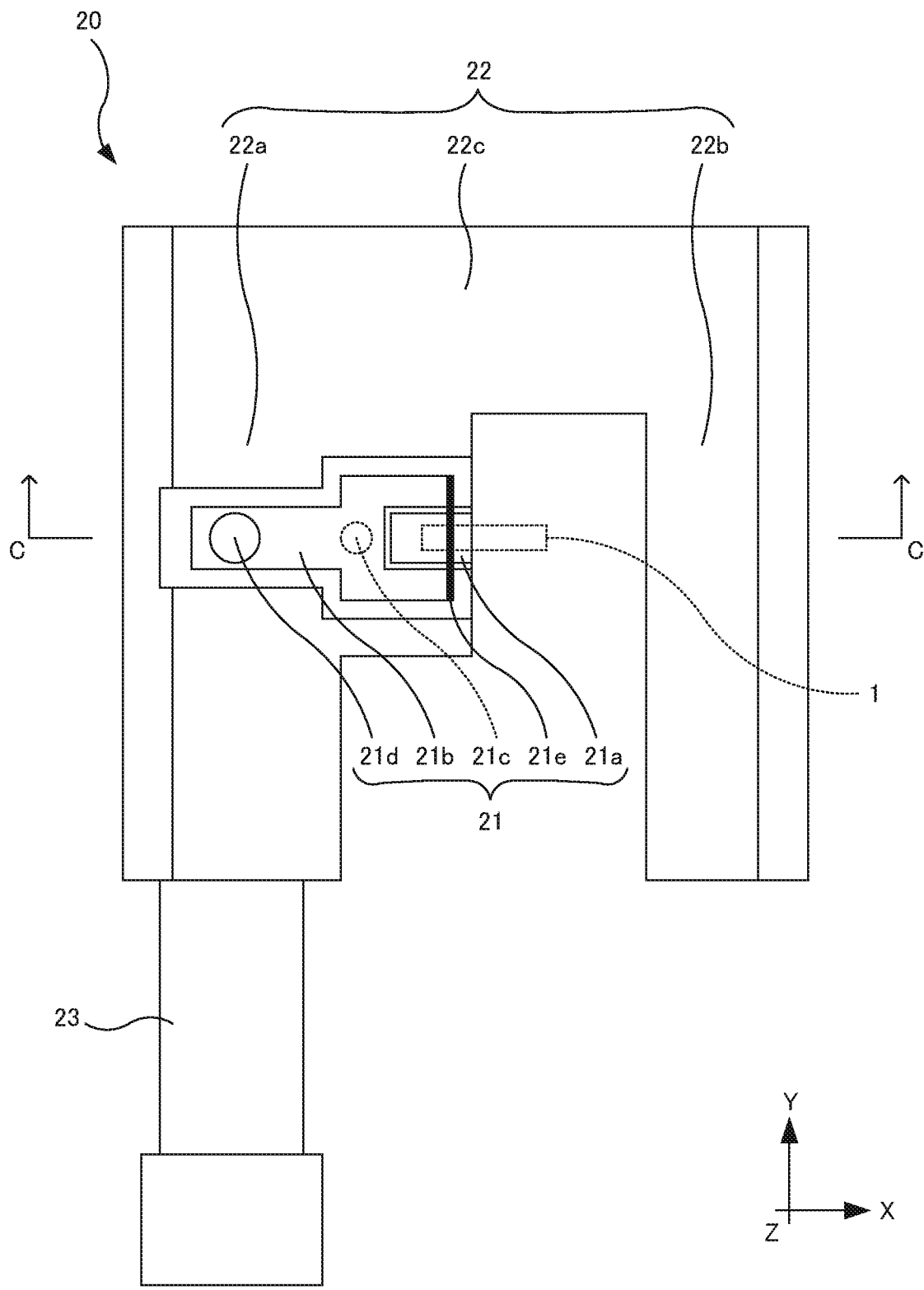
FIG. 8 is a plan diagram showing a general cantilever holder.
Figure 9A:
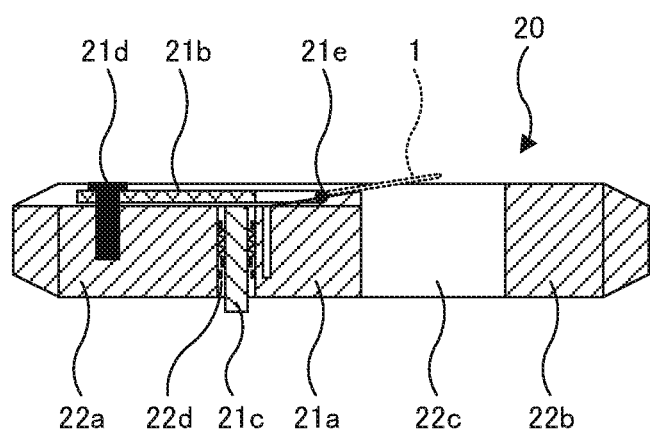
FIGS. 9A and 9B are cross-sectional diagrams along line C-C in FIG. 8.
Figure 9B:
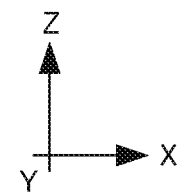
Figure 9B:
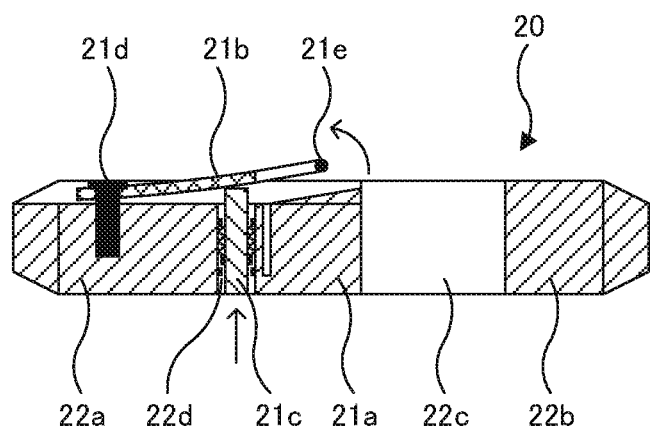
Figure 10:
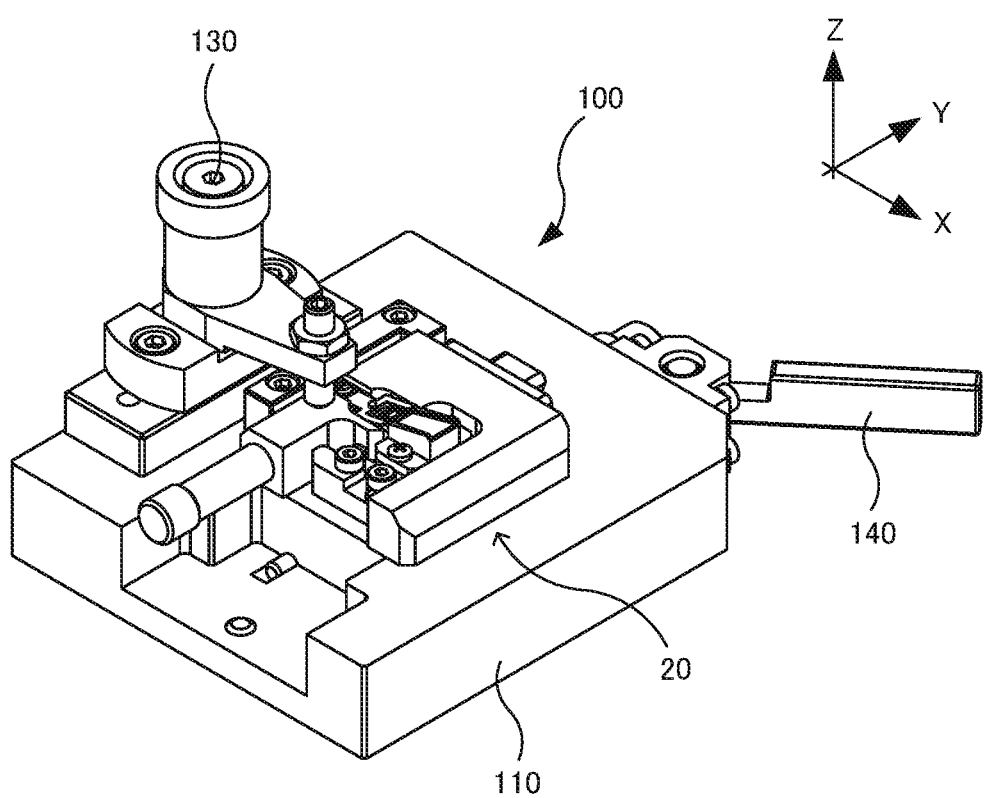
FIG. 10 is a perspective diagram showing the cantilever attachment fitting in FIG. 1.

FIGS. 1 and 2 are plan diagrams showing the cantilever attachment fitting according to one embodiment of the present invention. FIG. 1 is a diagram showing the process during the attachment of the cantilever to the cantilever holder. FIG. 2 is a diagram showing the completion of the attachment of the cantilever holder to the cantilever attachment fitting. FIG. 3 is a cross-sectional diagram along line A-A in FIG. 1. FIG. 4 is a cross-sectional diagram along line B-B in FIG. 1. FIG. 5 is a cross-sectional diagram along line A-A in FIG. 2. FIG. 6 is a cross-sectional diagram along line B-B in FIG. 2. FIG. 10 is a perspective diagram showing the cantilever attachment fitting in FIG. 1.

A cantilever attachment fitting 100 is provided with a base 110 in approximately rectangular parallelepiped formed (67 mm×75 mm×15 mm, for example), a sliding platform 120 and a pressing unit 130 provided on the upper surface of the base 110, and a moving mechanism 140 provided on the rear of the base 110.

A left side protruding portion 112 in an L shape (having a height of 7 mm, for example), a right side protruding portion 111 in an L shape (having a height of 5 mm, for example), and a hollow portion 115 in approximately rectangular parallelepiped form (35 mm×20 mm×10 mm, for example) are created on the upper surface of the base 110. As a result, the cantilever holder 20 is fixed in a predetermined location in the horizontal direction where the left side of the left side main body portion 22a makes contact with the right side of the left side protruding portion 112, the rear side of the left side main body portion 22a makes contact with the front side of the left side protruding portion 112, and the right side of the left side main body portion 22a makes contact with the left side of the right side protruding portion 111. Here, the hollow portion 115 can allow the power supply unit of a current amplifier built-in type cantilever holder to be placed therein in the case where such a cantilever holder is used.

The sliding platform 120 has a sliding surface 121 along which the cantilever 1 slides and two screw portions 122. The sliding surface 121 is an inclined surface that gradually declines in the −X direction at an angle of 7°, which is the same angle at which the upper surface of the attachment platform 21a declines. The width of the left end portion of the sliding surface 121 in the Y direction is slightly greater than the width of the attachment platform 21a, and the width gradually increases from the left end portion of the sliding surface 121 toward the right end portion. Here, a guide (not shown) that protrudes upward is formed on either side of the sliding surface 121 in order to prevent the cantilever 1 from slipping off the sliding surface 121. In addition, the sliding platform 120 is fixed to the upper surface of the right side protruding portion 111. When the cantilever holder 20 is fixed to the base 110 in a predetermined location, the attachment platform 21a of the cantilever holder 20 is arranged in a predetermined location to the left (X direction) of the sliding surface 121. Here, the two screw portions 122 make the height of the sliding surface 121 on the sliding platform 120 adjustable.

The pressing unit 130 has a fixed portion 134 formed in the left portion on the upper surface of the base 110, a rotational axis portion 134 in a columnar form that is attached to the fixed portion 134 so as to be rotatable, a rotational portion 132 in a columnar form for pressing the upper surface of the cantilever holder 20 downward, and a linking portion 133 in a plate form for connecting the rotational axis portion 131 and the rotational portion 132 at a predetermined distance in the horizontal direction.

The fixed portion 134 has a lower fixed portion 134a in a rectangular parallelepiped form and an upper fixed portion 134b attached above the lower fixed portion 134a. The upper fixed portion 134b is in an approximately elliptical columnar form, and a square recess is created in the center portion on the upper surface.

The rotational axis portion 131 is attached in a recess of the upper fixed portion 134b so as to be rotatable with a rotational axis in the Z direction. As a result, the rotational portion 132 is placed to the right of the rotational axis portion 131 or to the front of the rotational axis portion 131 as the rotational axis portion 131 rotates.

In addition, the rotational axis portion 131 is movable inside the recess between an upper location and a lower location in the Z direction relative to the fixed port ion 134. When the rotational axis portion 131 is placed in the upper location, the rotational portion 132 is rotatable 360° without being obstructed by the left side protruding portion 112 or the like. In addition, the upper surface of the cantilever holder 20 can be pressed downward with the rotational portion 132 when the rotational portion 132 is placed to the right and the rotational axis portion 131 is placed in the lower location (inside the recess).

A through hole 113 in a columnar form (having a diameter of 1.5 mm and a height of 15 mm, for example) in the Z direction and an insertion hole 114 in a columnar form (having a diameter of 4 mm, for example) in the Y direction are created inside the base 110 in such a manner that the through hole 113 and the insertion hole 114 are connected to each other. Here, a protrusion 114a that protrudes upward (Z direction) is formed in the center portion inside the insertion hole 114.

The moving mechanism 140 has an upward and downward moving member 141 in a columnar form (having a diameter of 1.5 mm and a height of 6 mm, for example) that is placed inside the through hole 113, a horizontally moving member 142 in a columnar form that is placed inside the insertion hole 114, and a lever portion 143 for moving the horizontally moving member 142.

The upward and downward moving member 141 is a body in a columnar form having approximately the same height as the through hole 113. In addition, the horizontally moving member 142 has an end portion 142a of which the diameter is smaller than the diameter of the insertion hole 114, a base portion 142b of which the diameter is the same as the diameter of the insertion hole 113, and a connection portion 142c of which the diameter gradually increases from the end portion 142a toward the base portion 142b. As a result, the upper surface of the upward and downward moving member 141 is located inside the base 110 when the lower end portion of the upward and downward moving member 141 is placed on the side of the end portion 142a. Meanwhile, the upper surface of the upward and downward moving member 141 is at the same height as the upper surface of the base 110 when the lower end portion of the upward and downward moving member 141 is placed on the side of the base portion 142b. Here, a trench 142d that extends in the axial direction is created in the lower surface of the base portion 142b in such a manner that the amount of movement of the horizontally moving member 142 is controlled when the protrusion 114a is placed inside the trench 142d.

The lever portion 143 has a fixed portion 143a fixed to the rear of the base 110 and an L-shaped body 143b of which the center portion is attached to the fixed portion 143a so as to be rotatable. One end portion of the L-shaped body 143b is attached to the rear end portion of the horizontally moving member 142, and the other end portion of the L-shaped body 143b is placed to the right rear of the base 110. As a result, one end portion of the L-shaped body 143b moves to the rear, which moves the horizontally moving member 142 to the rear, when an operator pulls the other end portion of the L-shaped body 143b to the front. In addition, one end portion of the L-shaped body 143b moves to the front, and at the same time, the other end portion of the L-shaped body 143b moves to the rear when an operator pushes the rear end portion of the horizontally moving member 142 to the front.

Here, the attachment method for attaching the cantilever 1 to the cantilever holder 20 is described. First, the operator selects an optimal type of cantilever 1 in accordance with the size of the sample S. Next, a cantilever attachment fitting 100 is prepared. Then, the other end portion of the L-shaped body 143b is pulled to the front so that one end portion of the L-shaped body 143b is moved to the rear, and at the same time, the horizontally moving member 142 is moved to the rear. As a result, the lower end portion of the lifting member 21c can be inserted into the through hole 113.

Next, the cantilever holder 20 is fixed to the base 110 of the cantilever attachment fitting 100 so that the upper surface of the cantilever holder 20 faces upward (see FIGS. 2, 4 and 6). At this time, the lower end portion of the lifting member 21c is inserted into the through hole 113 so that the upper surface of the cantilever holder is parallel to the horizontal plane.

Next, the rotational axis portion 131 is placed in the upper location, and the rotational axis portion 131 is rotated so that the rotational portion 132 is placed to the right. Then, the rotational axis portion 131 is placed in the lower location so that the rotational portion 132 is placed in the lower location and the upper surface of the cantilever holder 20 is pressed downward.

Next, the rear end portion of the horizontally moving member 142 is pushed to the front so that the lower end portion of the upward and downward moving member 141 is pushed upward and the lifting member 21c protrudes from the upper surface of the left side main body portion 22a, and together with this, the right end portion of the plate spring 21b moves upward. As a result, a gap is created between the upper surface of the attachment platform 21a and the lower surface of the wire 21e (see FIGS. 1, 3 and 5).

Next, tweezers (not shown) are prepared, and the cantilever 1 is held by the tweezers. Then, the cantilever 1 held by the tweezers is once placed on the upper surface of the sliding surface 121. After that, the tweezers are used to gradually slide the cantilever 1 along the upper surface of the sliding surface 121 so that the cantilever 1 is inserted into the gap between the upper surface of the attachment platform 21a and the lower surface of the wire 21e, and then is arranged. At this time, it is necessary for the operator to position the cantilever 1 so that there are no shifts in the location and at the angle. However, the operator can concentrate only on the positioning work.

Next, the other end portion of the L-shaped body 143b is pulled to the front in the state where the cantilever 1 is positioned so that one end portion of the L-shaped body 143b moves to the rear, which moves the horizontally moving member 142 to the rear. As a result, the lower end portion of the lifting member 21c is inserted into the through hole 113, and thus, the cantilever 1 is sandwiched and fixed between the upper surface of the attachment platform 21a and the lower surface of the wire 21e. At this time, the speed at which the upward and downward moving member 141 moves in the upward and downward directions and the amount of movement can be easily controlled using a lever principle, and therefore, the speed at which the lifting member 21c moves in the upward and downward directions and the amount of movement can be easily and appropriately controlled.

Next, the rotational axis portion 131 is placed in the upward location, and the rotational axis portion 131 is rotated so as to place the rotational portion 132 to the front (see FIGS. 2, 4 and 6).

Finally, the cantilever holder 20 is removed from the base 110 of the cantilever attachment fitting 100.

As described above, the cantilever attachment fitting 100 can allow the cantilever 1 to be placed on the upper surface of the sliding surface 121, and in addition can allow the operator to concentrate on only the positioning work, and therefore, even a novice (operator) can easily attach the cantilever 1 to the cantilever holder 20.

INDUSTRIAL APPLICABILITY

The present invention can be applied to scanning probe microscopes and the like that are appropriate for the observation of the surface of a sample.

EXPLANATION OF SYMBOLS 1 cantilever
20 cantilever holder
21a attachment platform
21b plate spring (pressing member)
21c lifting member (lifting mechanism)

100 cantilever attachment fitting
110 base
120 sliding platform
121 sliding surface
130 pressing unit

The invention claimed is:

1. A cantilever attachment fitting to be used for attaching a cantilever to a cantilever holder, comprising:
   an attachment platform including an upper surface configured to have a cantilever placed on the upper surface,
   a pressing member for pressing the cantilever against the upper surface of the attachment platform,
   a lifting mechanism for moving the pressing member upward from the upper surface of the attachment platform,
   a sliding platform having a sliding surface, the sliding surface being configured to allow said cantilever to be slid along the sliding surface by a person toward said attachment platform;
   a base for fixing said cantilever holder in the horizontal direction so that said attachment platform is in a predetermined location relative to said sliding platform; and
   a pressing unit for pressing downward said cantilever holder fixed to said base so that the cantilever is attached to the cantilever holder,
   wherein the upper surface of the attachment platform and said sliding surface of the sliding platform face upward relative to the vertical direction, the vertical direction being a direction perpendicular to a plane of the ground that supports the cantilever attachment fitting.

2. The cantilever attachment fitting according to claim 1, characterized in that
   the cantilever attachment fitting is used for a cantilever holder where said lifting mechanism is a lifting member that moves in the upward and downward directions,
   a hole into which the lower end portion of said lifting mechanism is inserted is created in said base, and an upward and downward moving member which is movable in the upward and downward directions is provided in the hole, and
   a moving mechanism is provided in order to move said upward and downward moving member in the upward and downward directions.

3. The cantilever attachment fitting according to claim 2, characterized in that said moving mechanism is provided with a horizontally moving member that moves in order to move said upward and downward moving member in the upward and downward directions, where the horizontally moving member moves using a lever principle.

4. A scanning probe microscope, characterized by comprising:
   the cantilever attachment fitting according to claim 1;
   said cantilever holder;
   a displacement measuring unit for measuring the displacement of said cantilever;
   a table on which a sample is placed; and
   a scanning means for scanning by moving said table or said cantilever holder.

* * * * *